Figure 6:
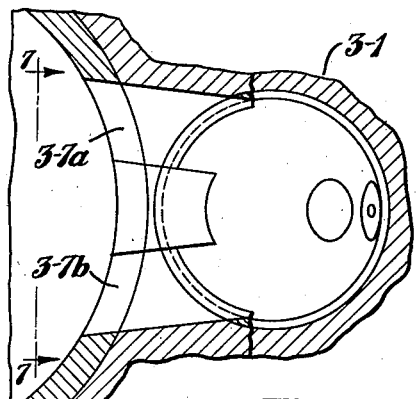

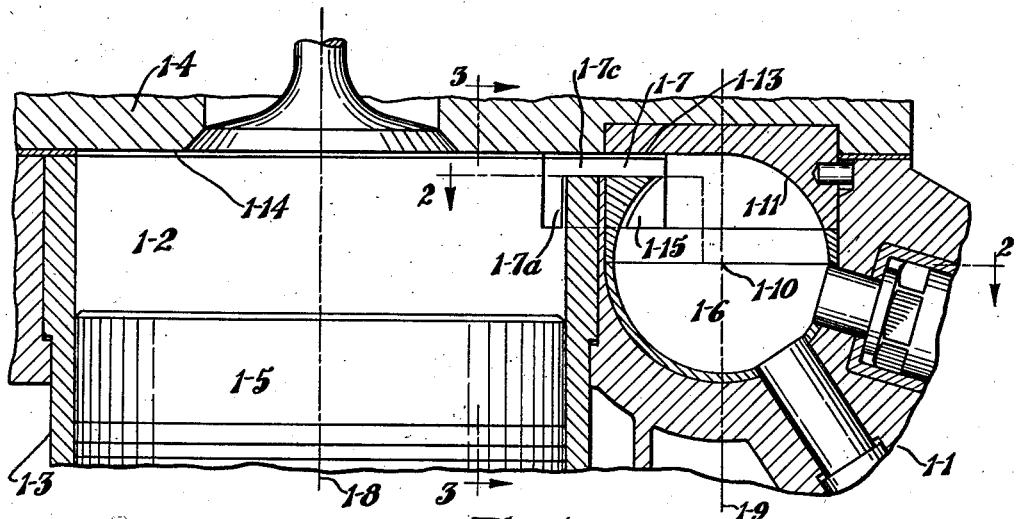
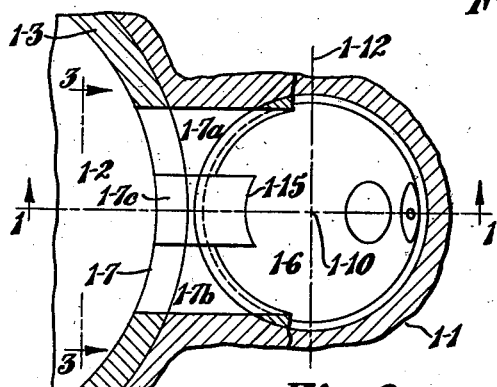
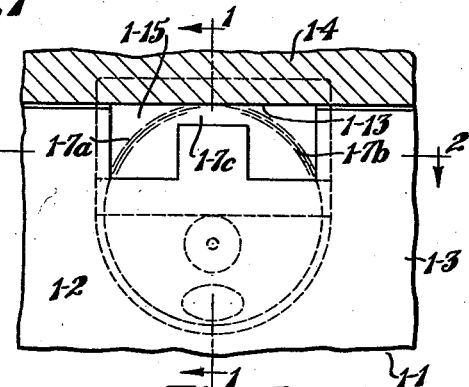
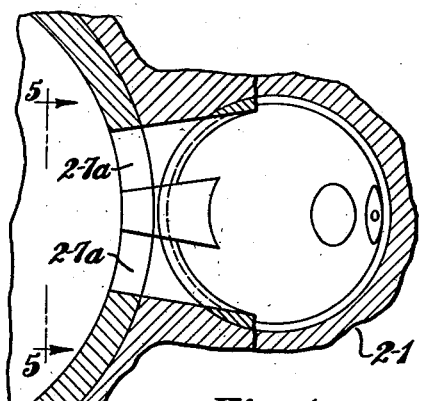
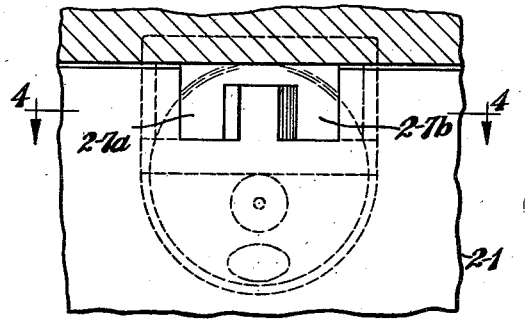

Sept. 12, 1939.  O. D. TREIBER  2,172,526
INTERNAL COMBUSTION ENGINE WITH CYLINDER CHAMBERS AND
WHIRL CHAMBERS AND CONNECTING PASSAGEWAYS
Filed Feb. 7, 1938  2 Sheets-Sheet 2

Inventor
Otis D. Treiber
By Frease and Bishop
Attorneys

Patented Sept. 12, 1939

2,172,526

UNITED STATES PATENT OFFICE 2,172,526

INTERNAL COMBUSTION ENGINE WITH CYLINDER CHAMBERS AND WHIRL CHAMBERS AND CONNECTING PASSAGEWAYS

Otis D. Treiber, Canton, Ohio, assignor to Hercules Motors Corporation, Canton, Ohio, a corporation of Ohio Application February 7, 1938, Serial No. 189,078

1 Claim. (Cl. 123—32)

My invention relates in general to internal combustion engines having one or more cylinder chambers and one or more whirl chambers, each whirl chamber being located adjacent one of the cylinder chambers, and each whirl chamber being communicatingly connected with its adjacent cylinder chamber by a passageway.

My invention relates more particularly, from one standpoint, to an engine of the foregoing general type, in which each whirl chamber has a surface curved about an axis and its connecting passageway has a preferably flat face tangent to the curved face, and the passageway preferably extending through the side of the cylinder, and the tangent face of the passageway preferably being a continuous straight extension of the cylinder head inner face of the cylinder chamber.

My invention relates more particularly, from another standpoint, to an engine of the foregoing general type with solid fuel injection and compression ignition, and in which the whirl chambers serve as injection, mixing, and combustion chambers, each of relatively small volume, and the maximum volume of each cylinder chamber being relatively large, and which may be a high speed, high compression, high power, compression ignition internal combustion engine, which may include in part the improvements set forth in my prior U. S. Letters Patent Re. No. 19,742, and/or the improvements set forth in my prior U. S. Letters Patent No. 2,062,951.

In an internal combustion engine having a cylinder chamber, a whirl chamber, and a passageway connecting the cylinder chamber with the whirl chamber, and with a reciprocating piston operating in the cylinder chamber, each cycle of operations of the engine includes, whether the engine operates on a four stroke cycle or a two stroke cycle, a compression stroke of the piston, which serves to compress an air charge previously drawn into the cylinder chamber, and to drive the air charge through the passageway into the whirl chamber.

The velocity of the air charge entering the passageway on the compression stroke of the piston is determined by the velocity of the piston, that is, the speed of operation of the engine, and by the geometrical characteristics and relationships of the cylinder chamber and passageway, and most important by whether or not the piston operates to cut-off, or reduce the effective opening of the passageway from the cylinder chamber during the last portion of the compression stroke of the piston, as occurs when the passageway extends through the side of the cylinder, rather than extending through the cylinder head.

The velocity imparted to the air charge in such an engine having a passageway cut-off piston action, increases during the last portions of the compression stroke of the piston and reaches a maximum at the end thereof, whereas when the passageway extends through the cylinder head there is a decrease in the velocity of the air charge entering the passageway during the last portions of the compression stroke of the piston.

The geometrical characteristics of the passageway determine the relative proportion of the particles of each compression air charge which have imparted thereto the maximum velocity. For example in an engine such as set forth in either of said U. S. Patents Re. No. 19,742 and No. 2,062,951, a maximum proportion of the particles of each compression air charge have imparted thereto the maximum velocity.

The air charge thus entering the passageway on the compression stroke of the piston have imparted thereto a velocity energy, and the passageway for best results should have such shape as to cause a minimum loss of velocity energy as the air charge passes therethrough, which is attained by the preferably rectangular multi-sided passageway of said U. S. Patent Re. No. 19,742 and No. 2,062,951, in which the preferably flat sides of the passageway are straight and without bumps or obstructions, so that the velocity of the incoming air charge is substantially uni-directional, without eddy currents and the resulting energy losses.

In such an engine, the functions of the whirl chamber include: first, to impart a whirling motion to the incoming air charge on the compression stroke of the piston with the least possible velocity energy loss of the air charge; and second, to be so formed as to impart to a maximum proportion of the particles of the air charge throughout the entire volume of the whirl chamber, velocities approaching as nearly as possible the maximum velocities imparted thereto by the piston action and their flow through the passageway.

In a compression ignition engine in which solid fuel is injected into the whirl chamber, a further function of the whirl chamber is that its arrangement in relationship with the fuel injecting nozzle be such as to attain as rapidly as possible a substantially complete mixing or intermingling of the particles of the fuel and air charges.

In an engine as above set forth, on the compression stroke of the piston, the particles of each air charge have motions or turbulence, after entering the passageway, and during movement therethrough, and in the whirl chamber, which are entirely controlled in direction and velocity by the shapes and arrangements and relationships with each other of the passageway and whirl chamber.

In the whirl chamber, the greater the circumferential extent of the curved controlling surface thereof about the axis of whirl, and the less the whirling air charge crosses the incoming air stream, the less is the loss of velocity energy in the total air charge, and the greater the whirling action or controlled turbulence.

In the engines of said U. S. Patents, Re. No. 19,742 and No. 2,062,951, the maximum velocity of each air charge, the distribution of the maximum velocity throughout all the particles of the air charge, and the velocity energy loss of the air charge are respectively superior to or less than the similar characteristics of engines of the prior art.

The objects of the present improvements include in general the provision in an engine having a cylinder chamber, a whirl chamber, and a passageway connecting the cylinder chamber and the whirl chamber, of improved forms or shapes and arrangements and relationships with each other of the passageway and whirl chamber so as to improve the action thereof upon the gases and/or mixtures moving therethrough and therein, and in mixing the air charge with the fuel charge in a compression ignition engine.

Further objects of the present improvements include the provision of improved passageways and whirl chambers of the types set forth in said U. S. Patents Re. No. 19,742 and No. 2,062,951, and which improve the action thereof upon the gases and/or mixtures moving therethrough and therein.

The foregoing and other objects are attained by the improvements, apparatus, parts, combinations, and sub-combinations, which comprise the present invention, and the nature of which is set forth in the following general statement, and preferred embodiments of which together with their mode of use are set forth by way of example in the following description, and which are particularly and distinctly pointed out and set forth in the appended claim forming part hereof.

The nature of the improvements of the present invention may be stated in general terms as including in an internal combustion engine, preferably with solid fuel injection and compression ignition, walls having inner faces forming a cylinder chamber, a whirl chamber, and a multichannel passageway connecting at one end with the cylinder chamber and at the other end with the whirl chamber.

The engine usually and preferably includes a cylinder having a cylinder bore, a cylinder head having an inner face extending across one end of the cylinder bore, and a piston operating in the cylinder bore and having an end face opposite the cylinder head inner face; and the cylinder chamber in such an engine is formed by the cylinder bore, the inner face of the cylinder head, and the end face of the piston.

The whirl chamber is located adjacent the cylinder, preferably at the side thereof, and the whirl chamber preferably includes a curved inner face having an axis of curvature and symmetry which is at right angles to a line parallel with the longitudinal axis of the cylinder bore.

The multi-channel passageway includes a plurality of multi-sided preferably rectangular channels spaced from each other laterally, and having a wall or walls of substantial width therebetween.

The channels preferably connect with each other laterally by a connecting channel common to all the spaced channels; and the spaced channels and the connecting channel preferably have a common face which is preferably tangent with the curved face of the whirl chamber, and which is also preferably a straight continuation of the cylinder head inner face.

The multi-channel passageway preferably extends through the side of the cylinder, so that its cylinder end is cut-off by the piston during the compression stroke thereof.

The multi-channel passageway provides for a maximum effective area of the curved face of the whirl chamber, by the shape of the whirl chamber end of the passageway, which may be an inverted U-shape in the preferred form, and at the same time attains a high velocity and directed flow of the gases and mixtures passing therethrough, and therein.

Figure 7:
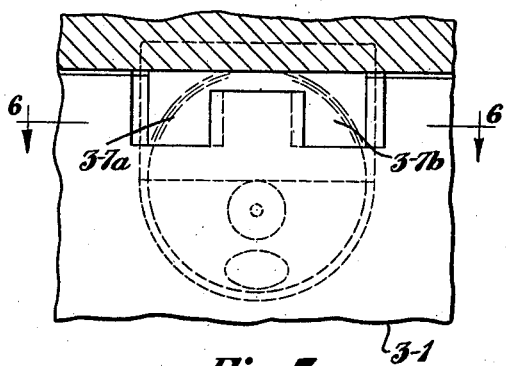

By way of example, a number of embodiments of the present improvements are illustrated in the accompanying drawings forming part hereof, in which Figure 1 is a fragmentary transverse sectional view as on lines 1—1, Figs. 2 and 3, illustrating the cylinder, whirl chamber, and connecting multi-channel passageway, and certain associated parts, of a compression ignition internal combustion engine including one embodiment of the present improvements;

Fig. 2, a fragmentary plan sectional view thereof as on lines 2—2, Figs. 1 and 3;

Fig. 3, another fragmentary transverse sectional view thereof as on lines 3—3, Figs. 1 and 2, looking towards the cylinder end of the connecting passageway;

Fig. 4, a view similar to Fig. 2, being a fragmentary plan sectional view as on line 4—4, Fig. 5, of another engine including a second embodiment of the present improvements;

Fig. 5, a fragmentary transverse sectional view thereof as on line 5—5, Fig. 4;

Fig. 6, a view similar to Fig. 2, being a fragmentary plan sectional view as on line 6—6, Fig. 7, of another engine including a third embodiment of the present improvements.

Figure 8:
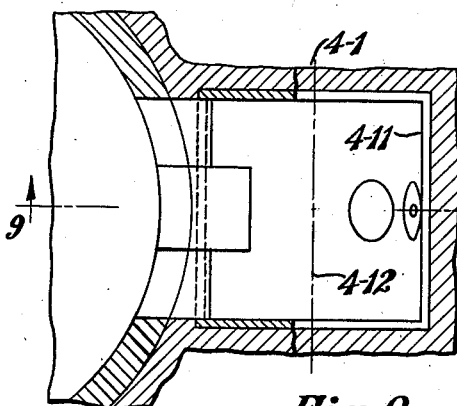
Figure 9:
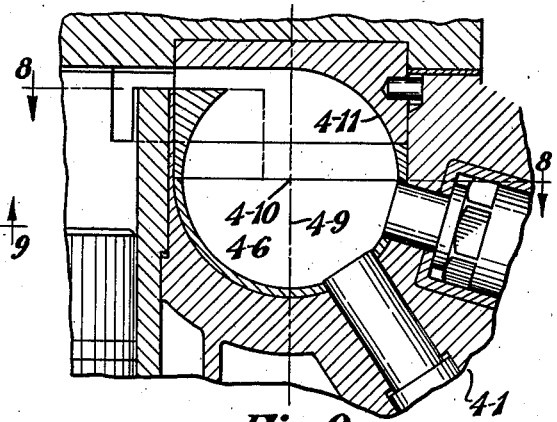
Figure 10:
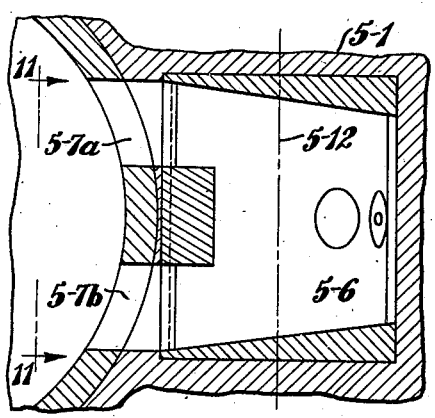
Figure 11:
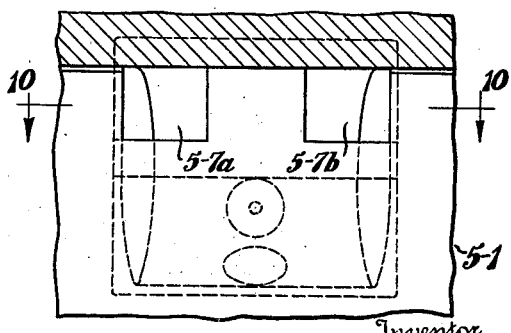

Fig. 7, a fragmentary transverse sectional view thereof as on line 7—7, Fig. 6;

Fig. 8, a view similar to Fig. 2, being a fragmentary plan sectional view as on line 8—8, Fig. 9, of another engine including a fourth embodiment of the present improvements;

Fig. 9, a fragmentary transverse sectional view thereof as on line 9—9, Fig. 8;

Fig. 10, a view similar to Fig. 2, being a fragmentary plan sectional view as on line 10—10, Fig. 11, of another engine including a fifth embodiment of the present improvements; and Fig. 11, a fragmentary transverse sectional view thereof as on line 11—11, Fig. 10.

Similar numerals refer to similar parts throughout the drawings.

The engines illustrated in the drawings include details of construction which are generally similar to the details of construction of the engine shown in said U. S. Letters Patent Re. No. 19,742 and in said U. S. Letters Patent No. 2,062,951.

In Figs. 1, 2, and 3 is illustrated an engine indicated generally by 1—1 and including one embodiment of the present improvements.

The engine 1—1 as shown is a compression ignition internal combustion engine of the general type set forth in said Patents Re. No. 19,742 and No. 2,062,951, and the parts of the engine 1—1, not shown or described herein, may be as set forth in said patents.

With respect to the present improvements, the engine 1—1 includes a cylinder chamber 1—2, which may also be termed a varying volume chamber, and which is formed by the cylinder 1—3, the cylinder head 1—4, and the piston 1—5 operating in the bore of the cylinder 1—3.

At one side of the cylinder 1—3, walls of the engine form a whirl chamber 1—6, which may be also termed a constant volume chamber, and walls of the engine form an improved multi-channel passageway 1—7 opening at one end into the cylinder chamber 1—2 and at the other end into the whirl chamber 1—6, whereby communication is effected between the cylinder chamber and the whirl chamber.

The longitudinal axis of the cylinder bore is indicated by the dot-dash line 1—8, and a line parallel to said axis 1—8 is indicated by the line 1—9 and passes through the center 1—10 of the side chamber 1—6.

The inner faces of the whirl chamber 1—6 include a face 1—11 curved about an axis 1—12 passing through the center 1—10 of the chamber 1—6 and at right angles to the line 1—9 parallel to the axis of the cylinder bore 1—8. As shown, and preferably, the face 1—11 is spherical.

The multi-channel passageway 1—7 preferably extends through the side of the cylinder 1—3, and includes a plurality of laterally spaced channels, preferably two, 1—7a, and 1—7b, and a connecting channel 1—7c laterally communicating between the spaced channels.

Each of the channels 1—7a, 1—7b, and 1—7c has an inner face which is tangent with the curved inner face 1—11 of the side chamber 1—6; and preferably as shown, the tangent face of all the channels is the common inner flat face 1—13, which is also preferably as shown a straight lateral continuation of the inner face 1—14 of the cylinder head.

The passageway 1—7 may also be described as having a transverse U shape as best shown in Fig. 3.

Preferably the connecting channel 1—7c communicates laterally with the channels 1—7a and 1—7b throughout the entire length thereof between the cylinder chamber 1—2 and the whirl chamber 1—6, and accordingly the sides of the channel 1—7c perpendicular to the tangent face 1—13 are formed by the upper adjacent side portions of the passageway channels 1—7a and 1—7b.

Each of the channels 1—7a, 1—7b, and 1—7c is multi-sided, and preferably rectangular as shown.

By the use of the laterally spaced multi-sided passageway channels 1—7a, and 1—7b, a maximum area of the central portion 1—15 of the spherically curved control surface 1—11 of the whirl chamber is attained, and there is a minimizing in the whirl chamber 1—6 of interference between the whirling air therein and the incoming air stream.

With a single connecting passageway, there is a tendency of the whirling air to interfere with or cut across the incoming tangential air stream.

By additionally providing the connecting channel 1—7c laterally communicating between the spaced channels 1—7a and 1—7b, and with the depth of the connecting channel 1—7c in the direction of the axis 1—8 of the cylinder bore substantially less than the similar dimensions of the channels 1—7a and 1—7b, the passageway 1—7 becomes a single rectangular passageway in the last portions of the compression stroke of the piston, during which the maximum velocity is imparted to the incoming air charge.

The combined action of the laterally spaced channels 1—7a and 1—7b, and the connecting channel 1—7c is to improve the action of the whirl chamber 1—6 on the air charge as a whole, by minimizing losses of energy therein, and with a consequent improvement in the mixing action of the whirl chamber 1—6, when as shown the engine 1—1 is a compression ignition engine of the type set forth in U. S. Patents Re. No. 19,742 and No. 2,062,951.

In the engine 1—1, the channels 1—7a and 1—7b are parallel with each other.

In Figs. 4 and 5 is illustrated another engine indicated generally by 2—1 including a second embodiment of the present improvements, and which is generally similar to the engine 1—1 with the exception that in the engine 2—1 the laterally spaced channels 2—7a and 2—7b diverge from the cylinder chamber end thereof.

In Figs. 6 and 7 is illustrated another engine indicated generally by 3—1 including a third embodiment of the present improvements, and which is generally similar to the engine 1—1 with the exception that in the engine 3—1 the channels 3—7a and 3—7b converge from the cylinder chamber end thereof.

In Figs. 8 and 9 is illustrated another engine indicated by 4—1 including a fourth embodiment of the present improvements which is generally similar to the engine 1—1 with the exception that in the engine 4—1 the whirl chamber 4—6 has a curved inner cylindric surface 4—11, the axis of curvature 4—12 of which is at right angles to an intersecting line 4—9 passing through the center 4—10 of the whirl chamber 4—6, the line 4—9 being parallel with the longitudinal axis of the cylinder bore.

In the engine 4—1, the end faces are at right angles to the axis of curvature 4—12.

In Figs. 10 and 11 is illustrated another engine indicated generally by 5—1 including a fifth embodiment of the present improvements which is generally similar to the engine 4—1, having a cylindric whirl chamber 5—6 with an axis of curvature 5—12, but in the engine 5—1 the end faces of the cylindric chamber 5—6 are angled with respect to each other.

Also in the engine 5—1, the channels 5—7a and 5—7b are not connected laterally, the angle end faces of the cylindric chamber 5—6 serving to converge the streams of air entering the whirl chamber 5—6.

In each of the engines 1—1, 2—1, 3—1, 4—1, and 5—1 embodying the present improvements there are a plurality of the multi-channel passageways connecting a whirl chamber with the cylinder chamber and which includes two laterally spaced multi-sided preferably rectangular channels, which in the engine 1—1 are the channels 1—7a and 1—7b. The lateral spacing of the multi-sided preferably rectangular channels 1—7a and 1—7b permits utilization of the maximum lateral width of the curved surface of the whirl chamber 1—6.

The air streams entering the whirl chamber through the laterally spaced channels 1—7a and 1—7b are converged by the spherical shape of the whirl chamber 1—6 towards the central portion thereof where because of the relatively short distance between the top and bottom faces of the channel 1—7c, the whirling action in the central portions of the spherical whirl chamber 1—6 about the axis 1—10 is imparted by 360 degrees of surface curved about the axis 1—10 minus the relatively small angle intercepted by the relatively shallow connecting channel 1—7c, and if the connecting channel 1—7c is dispensed with, there will be 360 degrees of whirl imparting curved surface in the central portions of the whirl chamber 1—6.

The connecting channel 1—7c is preferably used however to impart a sudden restriction in the total area of the inverted U passageway near the end of the compression stroke of the piston for providing an additional sudden increase in velocity of the incoming air charge.

In the engine of my prior U. S. Patent Re. No. 19,742, the possibility of utilizing the substantially full width of the spherical whirl chamber is available, but the creation of a central portion of the whirl chamber in which the whirling action is imparted by substantially 360 degrees of curved surface is not available.

In my prior U. S. Patent No. 2,062,951, there is shown a central tongue or lip in the connecting passageway, but the upper periphery of this tongue or lip is curved and is not spaced close enough to the top of the passageway to provide for the sudden velocity change available in the present improvements by the central shallow connecting channel 1—7c, and in any event the tongue or lip in my prior U. S. Patent No. 2,062,951 does not form three distinct channels as in the present improvements but is merely a tongue or lip at the end of a single passageway.

I claim:

In an internal combustion engine and the like, a cylinder having a bore, cylinder head means having an inner face extending across one end of the cylinder bore, a piston operating in the cylinder bore and having an end face opposite the cylinder head means inner face and forming therewith and with the cylinder bore a cylinder chamber, walls forming a whirl chamber adjacent the cylinder chamber, and walls forming a plurality of passageway channels providing communication between the cylinder chamber and the whirl chamber, each passageway channel having a plurality of inner faces angular with respect to each other, and each channel face extending between the cylinder chamber and the whirl chamber.

OTIS D. TREIBER.